US009751455B2

(12) United States Patent
Nakatani

(10) Patent No.: US 9,751,455 B2
(45) Date of Patent: *Sep. 5, 2017

(54) HEADLIGHT CONTROLLER AND VEHICLE HEADLIGHT SYSTEM

(71) Applicant: Stanley Electric Co., Ltd., Tokyo (JP)

(72) Inventor: Akihiro Nakatani, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/140,224

(22) Filed: Apr. 27, 2016

(65) Prior Publication Data

US 2016/0332560 A1    Nov. 17, 2016

(30) Foreign Application Priority Data

May 14, 2015 (JP) .................................. 2015-099427

(51) Int. Cl.
*B60Q 1/14* (2006.01)
*F21S 8/10* (2006.01)

(52) U.S. Cl.
CPC ........ *B60Q 1/1423* (2013.01); *F21S 48/1154* (2013.01); *F21S 48/1747* (2013.01); *B60Q 2300/056* (2013.01); *B60Q 2300/41* (2013.01); *B60Q 2300/42* (2013.01); *F21S 48/125* (2013.01)

(58) Field of Classification Search
CPC . B60Q 1/02; B60Q 1/14; B60Q 1/143; B60Q 2300/056; B60Q 2300/42; B60Q 2300/43; F21S 48/1789

USPC ............................ 315/77, 82; 307/10.1, 10.8
See application file for complete search history.

(56) References Cited

U.S. PATENT DOCUMENTS

| 8,373,182 B2 | 2/2013 | Seko et al. | |
|---|---|---|---|
| 2004/0114379 A1* | 6/2004 | Miller | B60Q 1/085 362/464 |
| 2007/0002571 A1* | 1/2007 | Cejnek | B60Q 1/12 362/460 |

(Continued)

FOREIGN PATENT DOCUMENTS

| JP | 2015-16774 A | 1/2015 |
|---|---|---|
| JP | 5692520 B2 | 4/2015 |

*Primary Examiner* — Tung X Le
(74) *Attorney, Agent, or Firm* — Kenealy Vaidya LLP

(57) ABSTRACT

A headlight controller and a vehicle headlight system including an ADB can include a headlight controller and an optical unit. The headlight controller can include a system controller, a vehicle detector and a camera photographing forward vehicles located in a travelling direction of a subject vehicle, and the system controller can be configured to output a light-emitting control signal to provide favorable light distribution patterns by using vehicle data output from the vehicle detector in accordance with image data output from the camera. The optical unit can be configured to provide the favorable light distribution patterns using lights emitted from a right and left light-emitting device in accordance with the light-emitting control signal. Thus, the disclosed subject matter can include providing vehicle headlight systems that can form various favorable light distribution patterns by utilizing the characteristics of the headlight controller and the optical unit in accordance with various traffic conditions.

10 Claims, 7 Drawing Sheets

(56) References Cited

U.S. PATENT DOCUMENTS

| | | | |
|---|---|---|---|
| 2007/0147055 A1* | 6/2007 | Komatsu | B60Q 1/085 362/464 |
| 2008/0192496 A1* | 8/2008 | Mochizuki | B60Q 1/143 362/466 |
| 2010/0020170 A1* | 1/2010 | Higgins-Luthman | B60Q 1/1423 348/135 |
| 2011/0012511 A1* | 1/2011 | Watanabe | B60Q 1/085 315/82 |
| 2014/0125227 A1* | 5/2014 | Ehlgen | G06T 7/90 315/82 |
| 2015/0055357 A1 | 2/2015 | Nakatani | |

* cited by examiner

HEADLIGHT CONTROLLER AND VEHICLE HEADLIGHT SYSTEM

This application claims the priority benefit under 35 U.S.C. §119 of Japanese Patent Application No. 2015-099427 filed on May 14, 2015, which is hereby incorporated in its entirety by reference.

BACKGROUND

1. Field

The presently disclosed subject matter relates to headlight controllers and vehicle headlight systems, and more particularly to vehicle headlight systems including an adaptive driving beam (ADB) using an optical unit, and the vehicle headlight systems having favorable light distribution patterns, which can be easy to drive at night, and which can prevent the optical unit from emitting a glare type light to oncoming vehicles on an oncoming traffic lane and vehicles moving forward on a driving lane.

2. Description of the Related Art

When drivers steer a car at night, the drivers usually want to steer the car while they turn on headlights for a high beam to improve a visibility. However, drivers must drive the car while they switch between the headlights for a high beam and headlights for a low beam in response to various traffic conditions so that the headlights do not emit a glare type light to oncoming vehicles, vehicles moving forward on a same driving lane, etc. Hence, the drivers always tend to employ the headlights for a low beam in a downtown due to their burdens of the switching operation, and also tend to employ the headlights for a high beam in a suburb.

In these cases, the drivers may frequently give a glare type light to oncoming vehicles, vehicles moving forward on a same driving lane and the like in some cases of traffic conditions such as a hill, a rough road, etc. Accordingly, vehicle headlight systems including an adaptive driving beam (ADB) have been developed. A vehicle headlight system including an ADB, for example, may contribute an improvement of visibility in a forward direction of a subject vehicle that has the ADB for drivers by detecting an oncoming vehicle, a forward vehicle and the like with a camera incorporated into the subject vehicle that has the ADB and by emitting a high beam for the drivers on an area except regions where the oncoming vehicle and the forward vehicle exist.

Therefore, the vehicle headlight system including an ADB may avoid the glare type light to oncoming vehicles, vehicles moving forward on a same driving lane and the like, and also may improve a visibility in a forward direction of the subject vehicle that has the ADB for the drivers while promptly detecting pedestrians for safe driving. A conventional headlight system including such an operation of ADB is disclosed in Patent Document No. 1 (Japanese Patent Application Laid Open JP 2015-16774). FIG. 7a is a schematic explanatory diagram depicting a conventional headlight system including an ADB, and FIG. 7b is a schematic explanatory view depicting a light distribution pattern of the conventional headlight system shown in FIG. 6a, which is disclosed in Patent Document No. 1.

The conventional headlight system 50 includes: a left lamp unit 51L including a left low beam lamp 51LL, a left high beam lamp 51LH, a left ADB lamp 51LA and a first lamp controller 52L configured to control the left low beam lamp 51LL, the left high beam lamp 51LH and the left ADB lamp 51LA; a right lamp unit 51R including a right low beam lamp 51RL, a right high beam lamp 51RH, a right ADB lamp 51RA and a second lamp controller 52R configured to control the right low beam lamp 51RL and the right high beam lamp 51RH in accordance with a high-low signal output from the first lamp controller 52L via a lamp network 56, and the right ADB lamp 51RA being connected to a line 57 so as to be controlled by the first lamp controller 52L of the left lamp unit 51L; a headlight controller 53 connecting to the first lamp controller 52L and the second lamp controller 52H via a controller network 54, and configured to control the first lamp controller 52L and the second lamp controller 52R; and a camera 55 connecting the controller network 54 to output image data detected by the camera 55 to the leadlight controller 53, as shown in FIG. 7a.

The conventional headlight system 50 may form a light-emitting region where includes a first projecting region An, a second projecting region An+1, a third projecting region An+2 and a fourth projecting region An+3 each having a light-emitting intensity (cd) as shown in FIG. 7b. When subject vehicles using the conventional headlight system 50 move from a rearward direction of vehicles moving forward on a same driving lane, 1,740 cd (Bf) is a light-emitting intensity, which may avoid the glare type light to the vehicles moving forward. When vehicles using the conventional headlight system 50 pass by oncoming vehicles on an oncoming traffic lane approaching in a direction toward the subject vehicles on a driving lane, 625 cd (Bo) is a light-emitting intensity, which may avoid the glare type light to the oncoming vehicles.

Hence, when the subject vehicles using the conventional headlight system 50 move from the rearward direction of the vehicles moving forward on the same driving lane, the subject vehicles may not emit the glare type light to the vehicles moving forward by controlling the headlight light system 50 using a light distribution pattern PADBf for the vehicles moving forward on a driving lane. Similarly, when the subject vehicles using the conventional headlight system 50 pass by the oncoming vehicles on the oncoming traffic lane approaching in the direction toward the subject vehicles on the driving lane, the subject vehicles may not emit the glare type light to the oncoming vehicles by controlling the headlight light system 50 using a light distribution pattern for the oncoming vehicles.

Specifically, the subject vehicles using the conventional headlight system 50 may drive using the light distribution pattern PADBf for the vehicles moving forward or the light distribution pattern PADBo for the oncoming vehicles. When the subject vehicles using the conventional headlight system 50 detect an oncoming vehicle with the camera 55, the subject vehicles may turn off the second projecting region An+1 and the third projecting region An+2 and may employ a light distribution pattern PADBo1 for the oncoming vehicle so as not to emit the glare type light to the oncoming vehicle by controlling the headlight light system 50. After the subject vehicles using the conventional headlight system 50 passed by the oncoming vehicle on the oncoming traffic lane, the subject vehicles may return to the light distribution pattern PADBo from the light distribution pattern PADBo1.

Similarly, when the subject vehicles using the conventional headlight system 50 detect a vehicle moving forward on the same driving lane with the camera 55, the vehicles may turn off the second projecting region An+1 and the third projecting region An+2 in the light distribution pattern PADBf for the vehicle moving forward so as not to emit the glare type light to the vehicles by controlling the headlight light system 50. After the vehicles using the conventional headlight system 50 have not detected the vehicle moving forward on the driving lane, the vehicles may return to the light distribution pattern PADBf.

However, in the subject vehicles using the conventional headlight system 50 which repeats such a lighting control, for example, when the conventional headlight system 50 turns off the second projecting region An+1 and the third projecting region An+2 in the light distribution pattern PADBo for the oncoming vehicles from the light distribution pattern PADBo emitting all projecting regions, each of light-emitting intensities of overlapping regions between the first projecting region An and the second projecting region An+1 and between the third projecting region An+2 and the fourth projecting region An+3 may reduce because the conventional headlight system 50 turns off the second projecting region An+1 and the third projecting region An+2, as shown by dotted lines in the light distribution pattern PADBo1.

Accordingly, such the lighting control may cause a degradation of visibility in a forward direction of the subject vehicles using the conventional headlight system 50. Especially, each of light-emitting intensities of the above-described overlapping regions must be lower than each of middle portions of the first projecting region An and the fourth projecting region An+3, respectively. Furthermore, because each of light-emitting intensities of the overlapping regions corresponds to a respective one of edge portions of light-emitting portions, the respective one of edge portions of the light-emitting portions should be bright for drivers of the subject vehicles using the conventional headlight system 50.

The above-referenced Patent Documents and additional Patent Documents are listed below and are hereby incorporated with their English abstracts and specification in their entireties.
1. Patent Document No. 1: Japanese Patent Application Laid Open JP 2015-16774
2. Patent Document No. 2: Japanese Patent No. 5,692,520
3. Patent Document No. 3: U.S. Pat. No. 8,373,182
4. Patent Document No. 3: U.S. Patent Publication No. US-2015-0055357-A1

The disclosed subject matter has been devised to consider the above and other problems, characteristics and features. Thus, exemplary embodiments of the disclosed subject matter can include headlight controllers including an adaptive driving system (ADB) for controlling a right and left headlight be capable of projecting a plurality of light-emitting patterns in a plurality of light-emitting areas, wherein the plurality of light-emitting patterns align in a horizontal direction of a road, each of the light-emitting patterns is independently drown, each of the adjacent light-emitting patterns overlaps with respect to each other without a space between the adjacent light-emitting patterns, and each of edge portions of the plurality of light-emitting areas is a respective one of non-overlapping regions of the adjacent light-emitting patterns and each of middle portions of the plurality of light-emitting areas is a respective one of overlapping regions of the adjacent light-emitting patterns.

The headlight controller can provide favorable light distribution patterns to safely drive at night in accordance with various traffic conditions, while preventing a right and left headlight from emitting a glare type light to oncoming vehicles and vehicles moving in a forward direction of a subject vehicle incorporating the headlight controller and the right and left headlight. Additionally, exemplary embodiments of the disclosed subject matter can include vehicle headlight systems including a right and left optical unit with a simple structure, which can be used as the right and left headlight for the above-described headlight controller. The optical unit does not include a plurality of lamps such as the conventional headlight system, and therefore can expand possibilities for design so as to be able to harmonize with various vehicular designs.

SUMMARY

The presently disclosed subject matter has been devised in view of the above and other characteristics, desires, and problems in the conventional art. An aspect of the disclosed subject matter can include headlight controllers including an ADB for controlling a right and left headlight, which can input light-emitting control signal from the headlight controllers so as to provide favorable light distribution patterns to safely drive at night, and which can prevent a light-emission of glare type light to oncoming vehicles and vehicles moving forward on a driving lane of a subject vehicle incorporating the headlight controller under the various traffic conditions. Another aspect of the disclosed subject matter can include providing vehicle headlight systems including the headlight controller and a right and left optical unit, which can be used as the right and left headlight having a high reliability for the headlight controller, and which can be easy to reduce a size of the headlight with a simple structure. The vehicle headlight systems can provide a favorable light distribution pattern that can be easy to drive at night for not only the subject vehicle but also vehicles traveling in a frontward direction of the subject vehicle by utilizing the characteristics of the headlight controller and the optical unit.

According to an aspect of the disclosed subject matter, a headlight controller including an ADB for controlling a right and left headlight be capable of projecting a plurality of light-emitting patterns in a plurality of light-emitting areas, wherein the light-emitting patterns align in a horizontal direction of a road, each of the light-emitting patterns is independently drown, each of the adjacent light-emitting patterns overlaps with respect to each other without a space between the adjacent light-emitting patterns, and each of edge portions of the light-emitting areas is a respective one of non-overlapping regions of the adjacent light-emitting patterns and each of middle portions of the light-emitting areas is a respective one of overlapping regions of the adjacent light-emitting patterns, can include: a camera located adjacent a subject vehicle, which incorporates the right and left headlight into a right and left front of the subject vehicle, configured to photograph at least one vehicle located in a forward direction of the subject vehicle, and the camera being configured to output the at least one vehicle photographed by the camera as image data; and a vehicle detector configured to detect the at least one vehicle in accordance with the image data output from the camera, configured to generate locating data of the at least one vehicle with respect to the optical axis of the camera, and being configured to output the locating data vehicle as vehicle data.

In addition, the headlight controller including the ADB can also include: a light-emitting area controller configured to detect whether the at least one vehicle exists or not in the travelling direction of the subject vehicle in accordance with the vehicle data output from the vehicle detector, configured to determine light pattern data including a light-emitting area and a non-light-emitting area when the vehicle exists, and configured to output said light pattern data as light-emitting area data; and a light distribution controller configured to receive the light-emitting area data output from the light-emitting area controller, and configured to output a light-emitting control signal to the right and left headlight of the object vehicle in accordance with the light-emitting area data output from the light-emitting area controller; and wherein at least one light-emitting area where the at least one vehicle is located in the plurality of light-emitting areas is darker than another light-emitting area where the at least one vehicle is not located in the plurality of light-emitting areas.

In the above-described exemplary headlight controllers, each of relative light intensities of the light-emitting patterns can be substantially the same when the vehicle detector does not detect the at least one vehicle in accordance with the image data output from the camera, and also each area of the adjacent light-emitting patterns overlapped with respect to each other can be substantially the same. The camera can be a color camera, which photographs color image data. Additionally, the optical axis of the camera can be located in a substantially parallel direction with each optical axis of the right and left headlight.

According to another aspect of the disclosed subject matter, vehicle headlight systems including an ADB can replace the right and left headlight of the headlight controllers described above with a right and left optical unit. Each of the right and left optical unit can include a plurality of light-emitting diodes (LEDs) as a light-emitting device to project the plurality of light-emitting patterns; and an LED drive circuit independently driving each of the LEDs. In this case, features immediately described above can be included in the vehicle headlight systems. The above-described exemplary vehicle headlight systems including the ADB further can include a projector lens located in front of the plurality of LEDs so that a projector optical axis of the projector lens intersects with a light-emitting surface of the LEDs.

According to the aspects of the disclosed subject matter, when the camera detects a forward vehicle in a forward direction of the subject vehicle incorporating the headlight controller while driving the subject vehicle projecting a light distribution pattern, the headlight controller can enable the light-emitting area controller to output the light-emitting area data in accordance with the vehicle data output from the vehicle detector to the light distribution controller, and also can enable the light distribution controller to output the light-emitting control signal generated by referring a light-emitting pattern table having applicable relative light intensities of the light-emitting pattern to the right and left headlight. Therefore, the headlight controller can provide a favorable light distribution pattern to safely drive at night while preventing the right and left headlight from emitting a glare type light to oncoming vehicles and vehicles moving forwards in the forward direction of the subject vehicle in accordance with various traffic conditions.

Furthermore, the optical unit of the headlight system can be used as the right and left headlight having a high reliability with a simple structure. Thus, the disclosed subject matter can also provide vehicle headlight systems using the headlight controller and the optical units, which can provide a favorable light distribution pattern that can be easy to drive at night for the subject vehicle and other vehicles traveling near the subject vehicle by utilizing the characteristics of the headlight controller and the optical unit.

BRIEF DESCRIPTION OF THE DRAWINGS

These and other characteristics and features of the disclosed subject matter will become clear from the following description with reference to the accompanying drawings, wherein:

FIG. 7b is a schematic explanatory view depicting a light distribution pattern of the conventional headlight system shown in FIG. 6a.

DETAILED DESCRIPTION OF EXEMPLARY EMBODIMENTS

Figure 1:
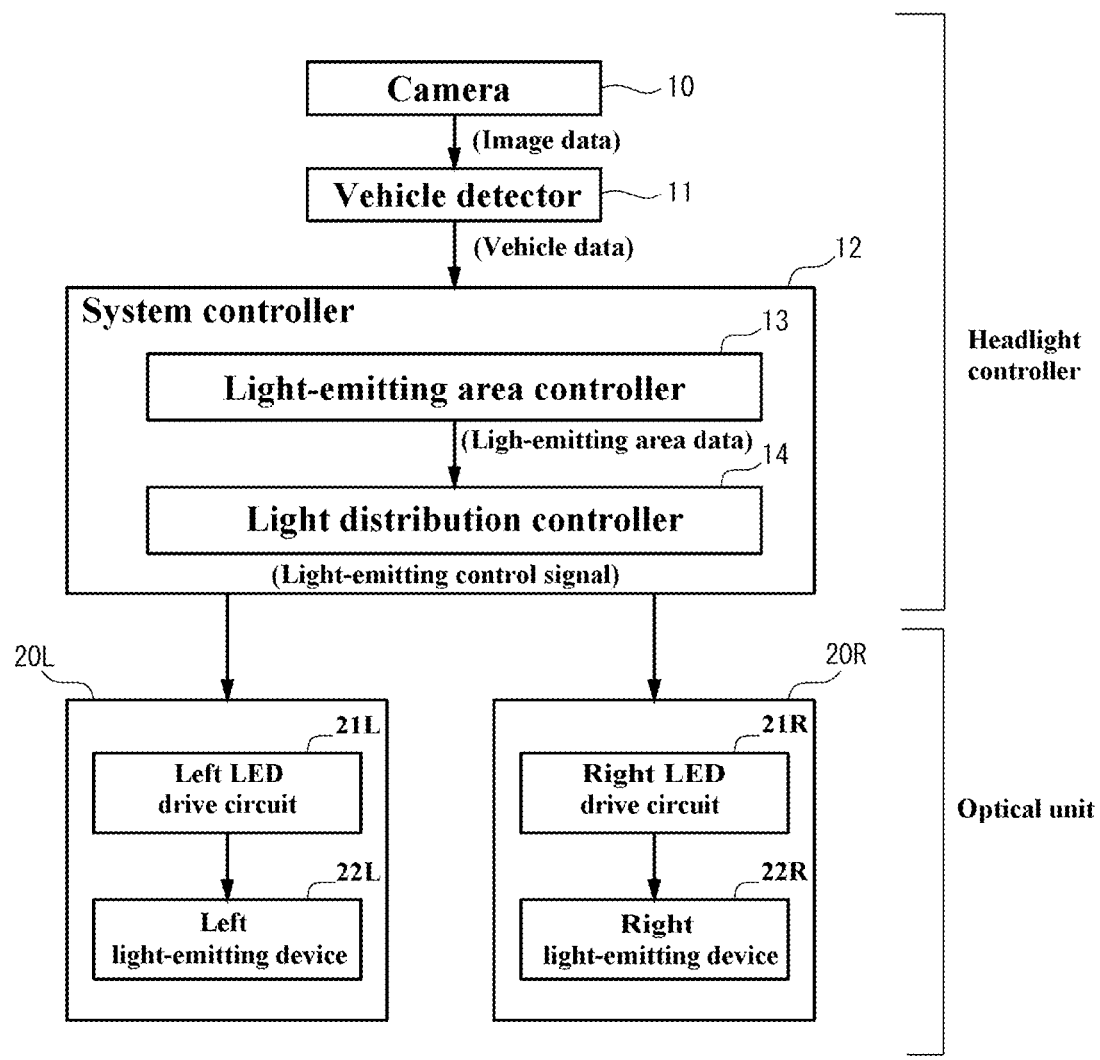
FIG. 1 is a block diagram showing an exemplary embodiment of a vehicle headlight system including a headlight controller and a right and left optical unit made in accordance with principles of the disclosed subject matter.

The disclosed subject matter will now be described in detail with reference to FIG. 1 to FIG. 6. FIG. 1 is a block diagram showing an exemplary embodiment of a vehicle headlight system including a headlight controller and a right and left optical unit made in accordance with principles of the disclosed subject matter. The vehicle headlight system can include the headlight controller and the right and left optical unit 20R and 20L, which can be used as a right and left headlight for a subject vehicle incorporating the headlight controller therein.

The headlight controller can include: a camera 10 having an optical axis CA (as described with reference to FIG. 4a later) located at a predetermined position in a forward direction of the subject vehicle (e.g., close to a vehicle interior mirror), photographing an objective space in the forward direction of the subject vehicle, configured to photograph at least one vehicle (at least one oncoming vehicle and at least one forward vehicle moving in a forward direction of the subject vehicle) located in the forward direction of the subject vehicle, and the camera 10 configured to output the at least one vehicle photographed by the camera 10 as image data; a vehicle detector 11 configured to detect the at least one vehicle in accordance with the image data output from the camera 10, configured to generate locating data of the at least one vehicle with respect to the optical axis CA of the camera 10, and being configured to output said locating vehicle data as vehicle data; and a system controller 12 configured to receive the vehicle data output from the vehicle detector 11, and being configured to output a light-emitting control signal to the right and left optical unit 20R and 20L, which can be used as the right and left headlight for the subject vehicle incorporating the headlight controller.

The system controller 12 of the headlight controller can includes: a light-emitting area controller 13 configured to determine a light-emitting area and a non-light-emitting area as light-emitting area data in accordance with the vehicle data output from the vehicle detector 11 and being configured to output the light-emitting area data; and a light distribution controller 14 configured to receive the light-emitting area data output from the light-emitting area controller 13, configured to determine a light-emitting control signal in accordance with the light-emitting area data including the light-emitting area and the non-light-emitting area, and being configure to output the light-emitting control signal to the optical unit 20R and 20L.

Next, the exemplary system structure of the disclosed subject matter and each operation of above-described elements will be described in more detail. As the camera 10, a charge coupled device (CCD) camera in which CCDs are arranged in a matrix array shape, a complementary metal-oxide semiconductor (CMOS) in which CMOSs are arranged in a matrix array shape and the like can be used to photograph the objective space in the forward direction of the subject vehicle. These cameras are generally provided with a projector lens to focus the objective space on each of the CCDs and the CMOSs and to protect each of the CCDs and the CMOSs from an external environment. The optical axis CA of the camera 10 can correspond to an optical axis of the projector lens.

The system controller 12 can include a computer system including a central processing unit (CPU), a read-only memory (ROM), a random access memory (RAM) and the like, and can be operated to extract the at least one vehicle included in the image data output from the camera 10 by running a program from the ROM while using the camera 10. In this case, the system controller 12 can detect only the at least one vehicle by a geometric feature extraction and the like, and then can also detect at least one of a headlight, a taillight, a stop lamp, a position lamp and the like as one of the vehicle data in the at least one vehicle by an optical feature extraction, etc.

Thereby, the light-emitting area controller 13 can detect whether the at least one vehicle exists or not in the travelling direction of the subject vehicle in accordance with the vehicle data output from the vehicle detector 11, configured to determine light pattern data including a light-emitting area and a non-light-emitting area when the vehicle exists, and configured to output said light pattern data as light-emitting area data. The vehicle detector 11 can be integrated into the camera 10, and also can be integrated into the system controller 12, which will now be described.

The system controller 12 can also include a computer system include a central processing unit (CPU), a read-only memory (ROM), a random access memory (RAM) and the like, and can be operated as a controller for the right and left optical unit 20R and 20L by running a program from the ROM while operating the camera 10 and the vehicle detector 11. The at least one vehicle means at least one oncoming vehicle and at least one forward vehicle driving forward in the forward direction of the subject vehicle incorporating the vehicle headlight system on a same driving lane. The vehicle detector 11 can detect an oncoming vehicle by recognizing at least one of a headlight and a position lamp, and also can detect a forward vehicle driving forward in a forward direction of the subject vehicle by extracting at least one of a taillight and a stop lamp as described above.

When a color camera (e.g., CCD camera including a color filter) is used as the camera 10, the vehicle detector 11 may be easy to detect whether the at least one vehicle is an oncoming vehicle or not because a taillight and a stop lamp emit red color light and a headlight and a position lamp emit light having a substantially white color tone. Additionally, an oncoming vehicle has features such that may approach toward the subject vehicle on an oncoming lane located adjacent a driving lane, and such that an approaching speed should be fast as compared with a forward vehicle driving forward on a same driving lane, on which the subject vehicle drives.

On the other hand, the forward vehicle driving forward on the same driving lane may have features such that an amount of movements in a horizontal direction with respect to the driving lane may be small and such that an approaching speed between the forward vehicle and the subject vehicle should be very slow as compared with the oncoming vehicle. Accordingly, the vehicle detector 11 may be easy to detect whether the at least one vehicle is an oncoming vehicle or not by using a plurality of the above-described features.

The light-emitting area controller 13 can receive the vehicle data output from the vehicle detector 11, and can determine a favorable light-emitting area and an appropriate amount of light. Then, the light-emitting area controller 13 can be configured to output the light-emitting area data to the light distribution controller 14, which can be configured to output the light-emitting control signal to the right and left optical unit 20R and 20L of the optical unit from the headlight controller.

Figure 2:
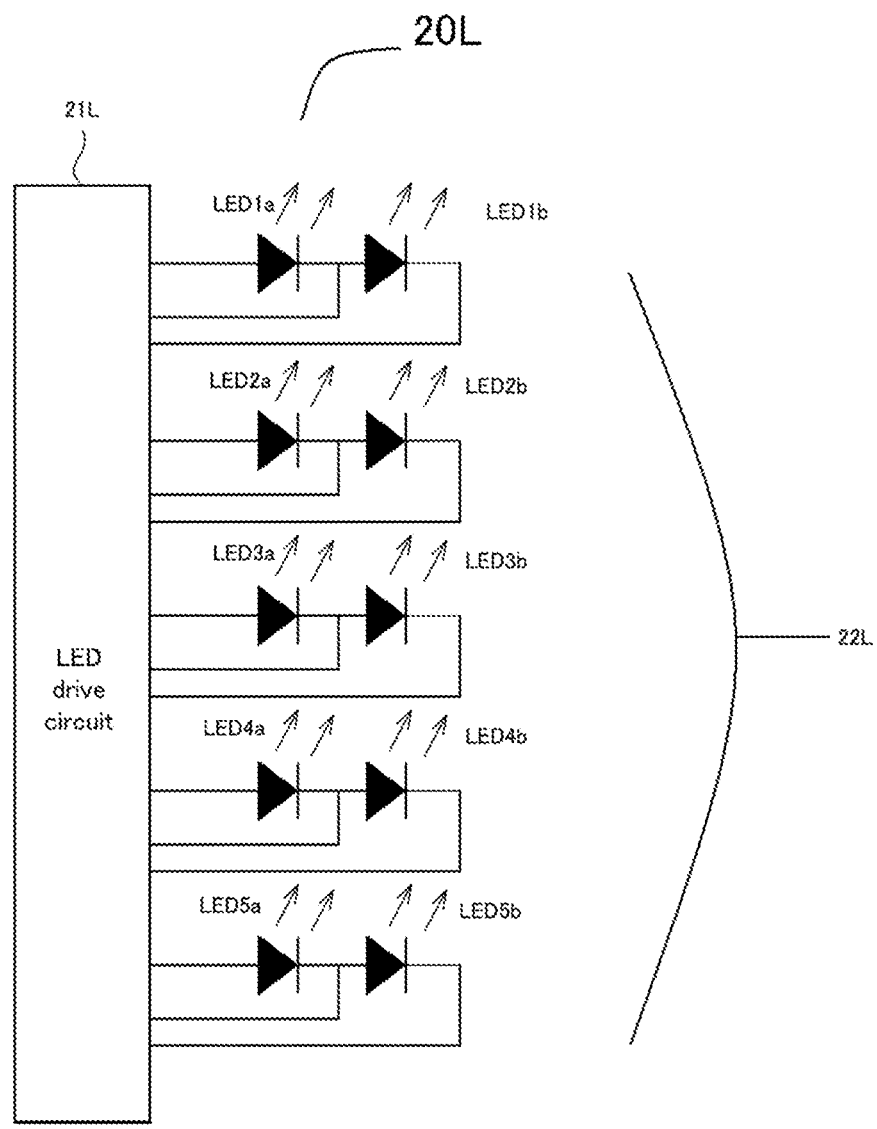
FIG. 2 is a circuit diagram showing an exemplary left optical unit including a left light-emitting device and a left LED drive circuit in the optical unit of the vehicle headlight system shown in FIG. 1.

The right optical unit 20R of the optical unit can include a right light-emitting device 22R and a right LED drive circuit 21R to drive the right light-emitting device 22R. Similarly, the left optical unit 20L can include a left light-emitting device 22L and a left LED drive circuit 21L to drive the left light-emitting device 22L. FIG. 2 is a circuit diagram showing an exemplary left optical unit 20L including the left light-emitting device 22L and the left LED drive circuit 21L in the optical unit of the vehicle headlight system shown in FIG. 1. The right optical unit 20R is abbreviated in FIG. 2 because it is a substantially same structure as the left optical unit 20L, and the left optical unit 20L will now be described here.

The left light-emitting device 22L can include a plurality of white LEDs having a substantially same white color tone, which are arranged in a matrix array shape and in a horizontal direction with respect to a road in order to be used as a light source for a left headlight. For example, the left light-emitting device 22L can include ten white LEDs of LED1a to LED5b, which are arranged in two rows and five columns, and which can be independently drown by the left LED drive circuit 21L, respectively. As the left-emitting device 22L, a semiconductor light-emitting device such that is disclosed in Patent Document No. 2 by a same inventor as this disclosed subject matter can be used.

Figure 3A:
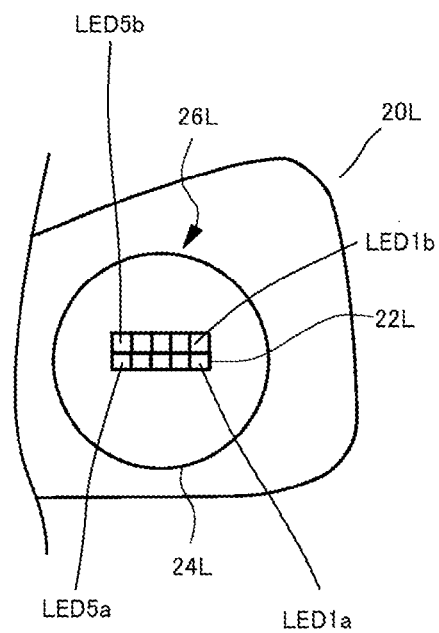
FIG. 3a is a schematic front view depicting the left optical unit shown in FIG. 2.

FIG. 3a is a schematic front view depicting the left optical unit 20L including a left light-emitting unit 26L, which is used as a light source for the left optical unit 20L. The left light-emitting unit 26L can include each of LED1a to LED5a and LED1b to LED5b arranged in two rows and five columns on a base board 26B, which aligns in a substantially horizontal direction with respect to a road. Thereby, the right and left optical unit 20R and 20L can provide favorable light distribution patterns in accordance with various traffic conditions by using the light-emitting control signal output from the light distribution controller 14, which can receive the light-emitting area data output from the light-emitting area controller 13 as described above. Each of the right and left optical unit 20R and 20L can also include a turn signal lamp, a position lamp, etc.

Figure 3C:
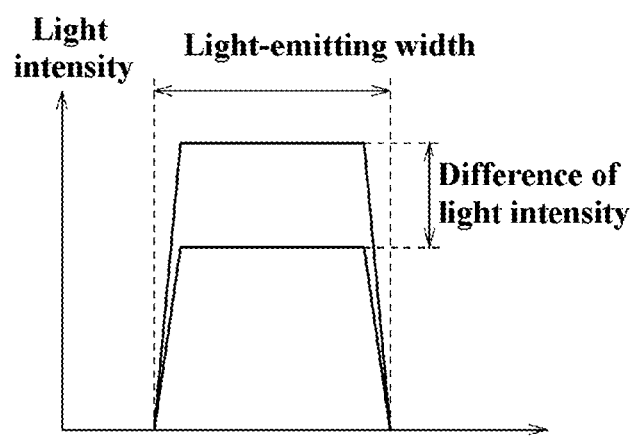
FIG. 3b is a schematic side cross-sectional view depicting a locating relation between a left light-emitting device and a left projector lens in a left light-emitting unit of the left optical unit shown in FIG. 3a, and FIG. 3c is an explanatory diagram depicting a light-emitting pattern emitted from a respective one of LED1a to LED5b of the left light-emitting device.
Figure 3B:
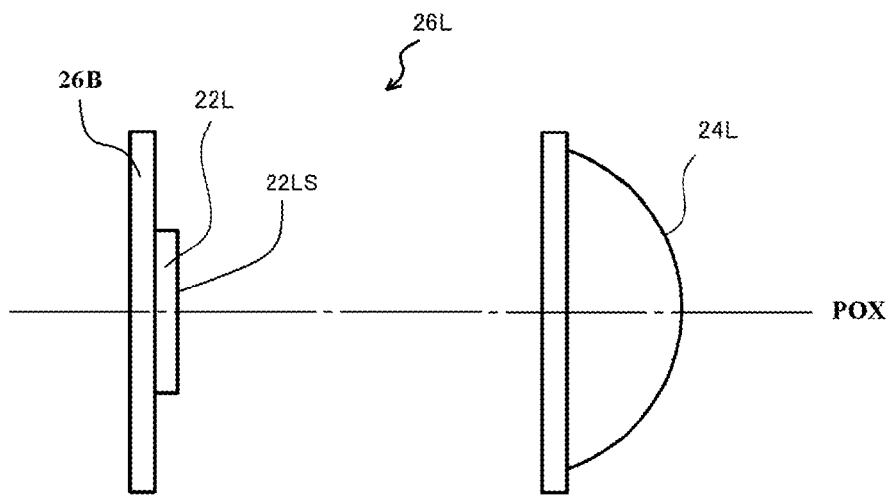

FIG. 3b is a schematic side cross-sectional views showing a locating relation between the left light-emitting device 22L and a left projector lens 24L in the left light-emitting unit 26L. The left light-emitting unit 26L can include the left projector lens 24L having a optical axis OX and the left light-emitting device 22L located in front of the projector lens 24 so that a light-emitting surface 22LS of the left light-emitting device 22L faces an incident surface of the projector lens 24L. The optical axis OX of the left projector lens 24L can intersect with the light-emitting surface 22LS of the left light-emitting device 22L at a substantially right angle.

When each of LED1a to LED5b arranged in two rows and five columns is the semiconductor light-emitting device, which is disclosed in Patent Document No. 3 owned by Applicant of this disclose subject matter, because a reflective material surrounds a light-emitting surface of the semiconductor light-emitting device, the left light-emitting unit 26L can prevent each of LED1a to LED5b from an optical interference between the adjacent LEDs. Accordingly, the right and left optical unit 20R and 20L can provide favorable light distribution patterns having a clear boundary for a safe driving in accordance with various traffic conditions by using the light-emitting control signal output from the light distribution controller 14. Additionally, as the right and left optical unit 20R and 20L, an optical unit disclosed in Patent Document No. 4 by the same inventor as this disclose subject matter can also be used.

FIG. 3c is an explanatory diagram depicting a light-emitting pattern emitted from a respective one of LED1a to LED5b of the left light-emitting device 22L. The respective one of LED1a to LED5b can emit a light-emitting pattern having a substantially same light-emitting width and a light intensity, and the light-emitting width of the respective one can be substantially the same even the light intensity thereof varies, respectively.

Figure 4A:
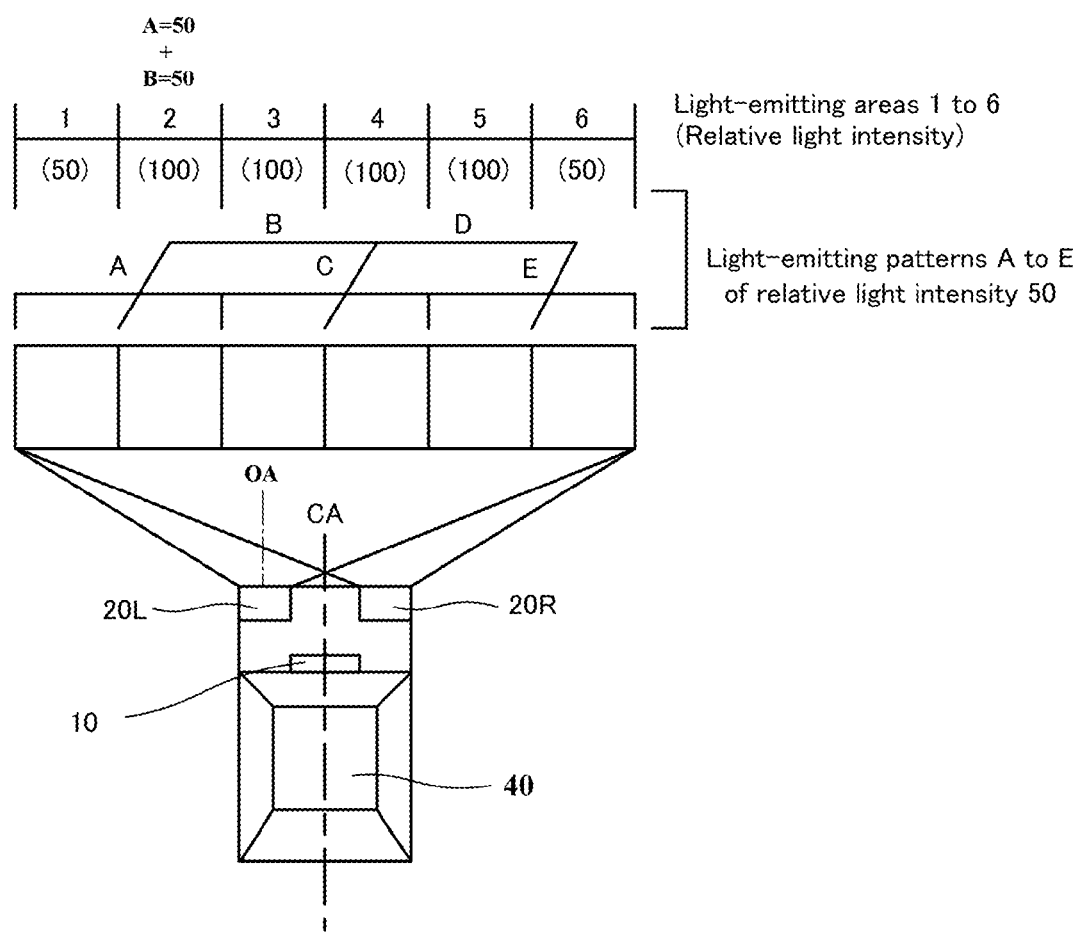
FIGS. 4a and 4b are explanatory top and front views showing exemplary light-emitting patterns projected from the vehicle headlight system shown in FIG. 1, respectively.
Figure 4B:
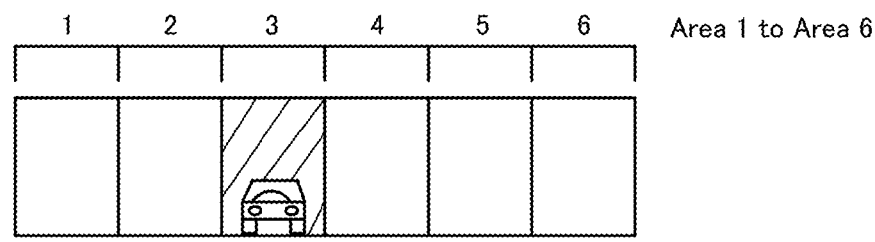

FIGS. 4a and 4b are explanatory views showing exemplary light distribution patterns projected from the vehicle headlight system shown in FIG. 1, respectively. The optical unit 20 R and 20L, which are attached to a right and left front of a subject vehicle 40, can form a light distribution pattern including light-emitting patterns A to E in light-emitting areas 1 to 6. Lights emitted from the LED1a and the LED1b can form a light-emitting pattern A, lights emitted from the LED2a and the LED2b can form a light-emitting pattern B, and serially lights emitted from the LED5a and the LED5b can form a light-emitting pattern E.

In this case, each of the light-emitting pattern A and the light-emitting pattern B, which have a substantially relative light intensity 50, can be overlapped in an adjacent area, and also each of the light-emitting pattern B and the light-emitting pattern C, which have a substantially relative light intensity 50 in common with each of the light-emitting pattern A and the light-emitting pattern B, can be overlapped in an adjacent area, where the light-emitting pattern B does not overlap with the light-emitting pattern A.

Accordingly, the light-emitting pattern B can overlap with the light-emitting pattern A and the light-emitting pattern C so as not to substantially include a space between the light-emitting pattern A and the light-emitting pattern C. A light-emitting pattern D can also overlap with the light-emitting pattern C and the light-emitting pattern E so as not to substantially include a space between the light-emitting pattern C and the light-emitting pattern E. Each of the above-described overlapping areas of the adjacent light-emitting patterns A to E can be substantially the same.

Each area of the light-emitting patterns A and E, which are located at both end areas of the light-emitting areas 1 and 6 and are not overlapped with the light-emitting patterns B and D, can be substantially the same, respectively. Each of the overlapping areas of the adjacent light-emitting patterns A to E can also be substantially the same in common with each area of the light-emitting patterns A and E, which are located at the both end areas of the light-emitting areas 1 and 6, and which are not overlapped with the light-emitting patterns B and D, respectively. Each of the light-emitting areas 2 to 5 can correspond to each of the overlapping areas of the adjacent light-emitting patterns A to E, respectively.

In these cases, each width of the light-emitting areas 1 to 6 can be substantially the same with respect to each other as shown in FIG. 4a. Additionally, when each of relative light intensities of the light-emitting patterns A to E is substantially 50, because each of relative composite light intensities of the light-emitting areas 1 to 6 can be substantially 50, 100, 100, 100, 100 and 50 (e.g., a relative composite light intensity of the area 2=A(=50)+B (=50)), the vehicle headlight system can provide a favorable light distribution pattern, in which a middle portion of the light distribution pattern becomes brighter than both outer portions.

The optical axis OX of the optical unit (the right and left optical unit 20R and 20L) can substantially correspond to the optical axis CA of the camera 10. When the camera 10 detects a forward vehicle, for example, on the light-emitting area 3 in the above-described light distribution pattern projected from the vehicle headlight system, the vehicle headlight system cannot emit the light-emitting patterns B and C on only the light-emitting area 3 so as not to emit a glare type light to the forward vehicle as shown in FIG. 4b. Exemplary methods of the disclosed subject matter to avoid a glare type light to the forward vehicle will now be described with reference to FIG. 5a to FIG. 5c to facilitate understandings.

Figure 5A:
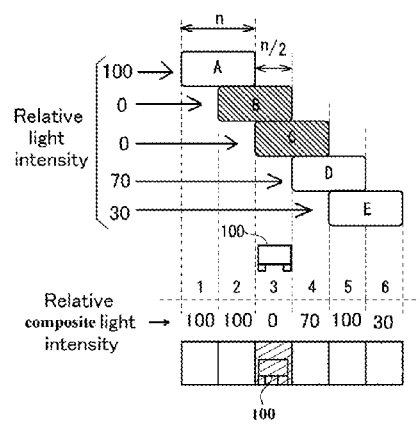
FIGS. 5a to 5c are explanatory exploded diagrams showing the light distribution patterns shown in FIGS. 4a and 4b, when a camera detects a forward vehicle located relatively far away from a subject vehicle incorporating the vehicle headlight system shown in FIG. 1, when the camera detects a forward vehicle, which is located relatively far away from the subject vehicle and also is located in a rightward direction of the subject vehicle, and when the camera detects a forward vehicle located relatively near the subject vehicle, respectively.
Figure 5B:
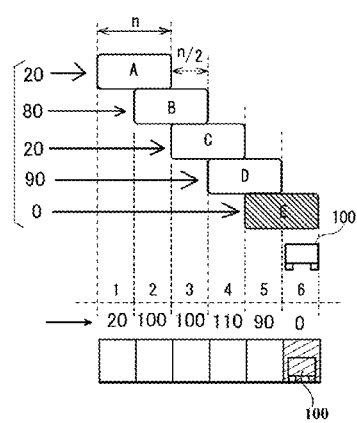
Figure 5C:
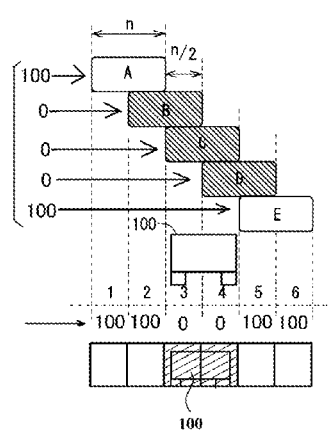

FIGS. 5a to 5c are explanatory exploded diagrams showing the light distribution patterns shown in FIGS. 4a and 4b, when the camera detects a forward vehicle located relatively far away from a subject vehicle incorporating the vehicle headlight system shown in FIG. 1, when the camera detects a forward vehicle, which is located relatively far away from the subject vehicle and also is located in a rightward direction of the subject vehicle, and when the camera detects a forward vehicle located relatively near the subject vehicle, respectively. Additionally, each of relative composite light intensities of the light-emitting areas 1 to 6 is also described.

When the camera 10 detects a forward vehicle 100 located relatively far away from the subject vehicle 40 incorporating the vehicle headlight system as shown in FIG. 5a while driving the subject vehicle 40 projecting the light distribution pattern as shown in FIG. 4a, for example, the vehicle headlight system can enable each of the relative light intensities of the light-emitting patterns A to E to set up substantially 100, 0, 0, 70 and 30, respectively. Thereby, each of the relative composite light intensities of the light-emitting areas 1 to 6 can become substantially 100, 100, 0, 70, 100 and 30, respectively.

Accordingly, the vehicle headlight system can provide a favorable light distribution pattern, which avoids a glare type light to the forward vehicle 100 and has a relatively uniform light intensity around the forward vehicle 100. When the relative light intensity of the light-emitting pattern A sets up substantially 100, the light-emitting pattern A can set up the 100 by turning on the LEDs 1a and 1b shown in FIG. 2 and FIG. 3a. When the relative light intensity of the light-emitting pattern A sets up substantially 50, the light-emitting pattern A can set up 100 by turning on either the LEDs 1a or 1b shown in FIG. 2 and FIG. 3a. When the relative light intensity of the light-emitting pattern D is varied from substantially 50 to 70, the light-emitting pattern B can set up substantially 70 by dimming at least one of the LEDs 4a or 4b shown in FIG. 2 and FIG. 3a.

Next, when the camera 100 detects the forward vehicle 100, which is located relatively far away from the subject vehicle 40 and also is located in a rightward direction of the subject vehicle 40, the vehicle headlight system can enable each of the relative light intensities of the light-emitting patterns A to E to set up 20, 80, 20, 90 and 0, respectively. Thereby, each of the relative composite light intensities of the light-emitting areas 1 to 6 can become substantially 20, 100, 100, 110, 90 and 0, respectively, as shown in FIG. 5b.

Therefore, the vehicle headlight system can provide a favorable light distribution pattern, which avoids a glare type light to the forward vehicle 100 and is bright on the middle portion of the light distribution pattern. Additionally, the vehicle headlight system can emit light having a high relative light-intensity of 90 in the light-emitting area 5 adjacent the light-emitting area 6 where it avoids a glare type light to the forward vehicle 100, even when the light-emitting area 5 is located near the edge portion of the light distribution pattern.

As shown in FIG. 5c, when the camera 10 detects a forward vehicle located relatively near the subject vehicle 40, the vehicle headlight system can enable each of the relative light intensities of the light-emitting patterns A to E to set up 100, 0, 0, 0 and 100, respectively. Thereby, each of the relative composite light intensities of the light-emitting areas 1 to 6 can become substantially 100, 100, 0, 0, 100 and 100, respectively. Accordingly, the vehicle headlight system can provide a favorable light distribution pattern, which avoids a glare type light to the forward vehicle 100 and has a uniform light-intensity around the forward vehicle 100.

The above-described relative light intensities of the light-emitting patterns A to E can be major examples of the view that the vehicle headlight system can provide a favorable light distribution pattern while avoiding a glare type light to the forward vehicle 100 according to a location of the forward vehicle 100. Especially, in the relative composite light intensities of the light-emitting areas, an area of relative light intensity 0 to avoid a glare type light to the forward vehicle 100 need not necessarily keep the relative light intensity 0. The area to avoid a glare type light to the forward vehicle 100 can be darker (e.g., a relative light intensity 20) than another area according to a distance between the subject vehicle 40 and the forward vehicle 100.

In addition, the vehicle detector 11 can distinguish the oncoming vehicle and the forward vehicle moving in a forward direction of the subject vehicle 40 in the vehicle data. Thereby, the vehicle headlight system can appropriately set up the relative light intensity on the area to avoid a glare type light to the forward vehicle 100. The headlight controller of the vehicle headlight system can include a light-emitting pattern table having applicable relative light intensities of the light-emitting patterns A to E according to the location of the forward vehicle 100 and the above-described conditions.

Therefore, the vehicle headlight system can enable the light-emitting area controller 13 to output the light-emitting area data, which are generated in accordance with the vehicle data output from the vehicle detector 11, to the light distribution controller 14, and also can enable the light distribution controller 14 to output the light-emitting control signal, which are generated by referring the light-emitting pattern table having the applicable relative light intensities of the light-emitting patterns A to E in accordance with the light-emitting area data output from the light-emitting area controller 13, to the optical unit.

Figure 6:
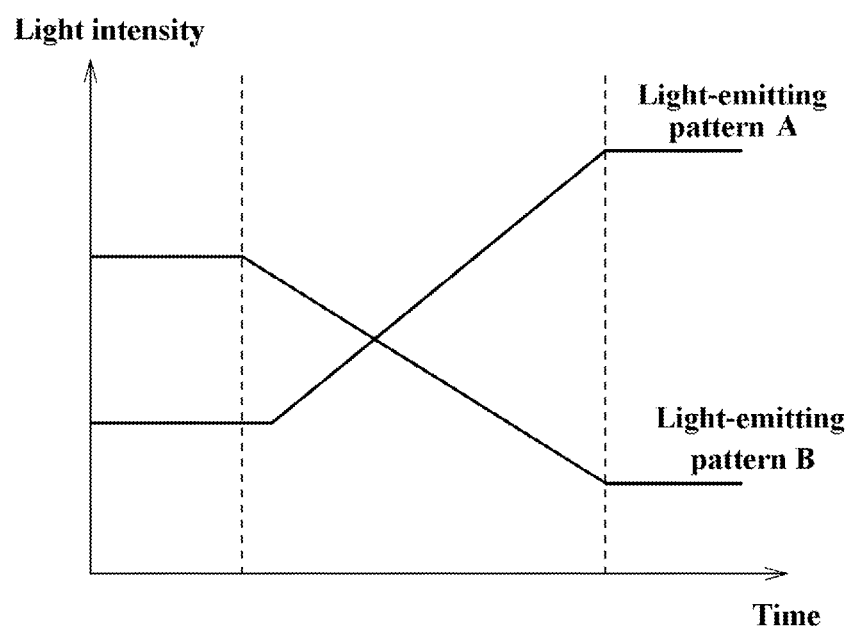
FIG. 6 is an explanatory diagram depicting an exemplary revised time for the headlight controller of the vehicle headlight system shown in FIG. 1.
Figure 7A:
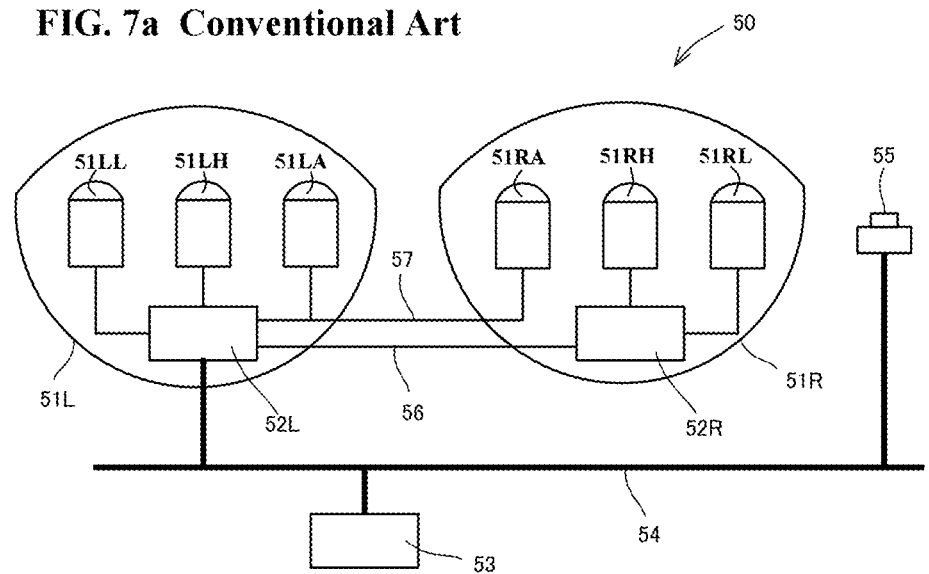
FIG. 7a is a schematic explanatory diagram depicting a conventional headlight system including an ADB.
Figure 7B:
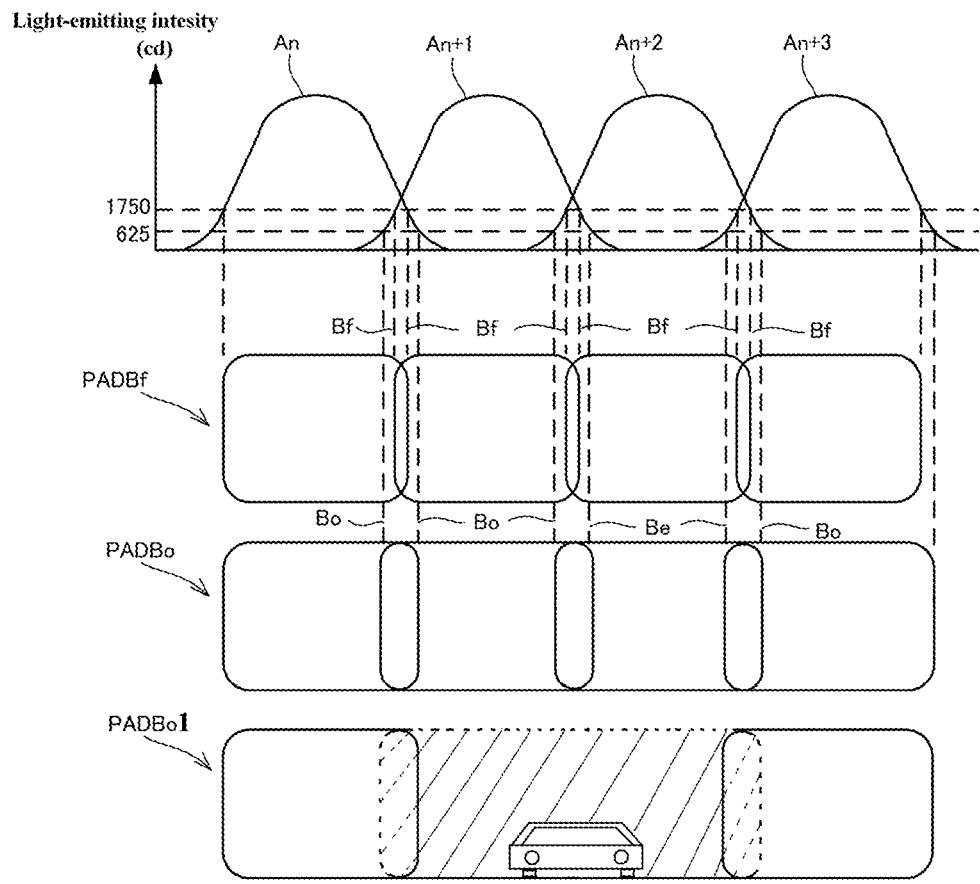

Thereby, the vehicle headlight system can provide the favorable light distribution patterns, which avoid a glare type light to the forward vehicle 100 and have the uniform light-intensity around the forward vehicle 100 as shown in FIG. 5a to FIG. 5c. Additionally, each of the adjacent light-emitting patterns can vary a revised time according to a traffic condition. FIG. 6 shows a case where the optical unit varies the light intensity of the light-emitting pattern A from a low light intensity to a high light intensity for long time (e.g., 5 to 60 seconds) and also varies the light intensity of the light-emitting pattern B from a high light intensity to a low light intensity for a relative long time. When the optical unit varies the light intensity of the light-emitting pattern from a low light intensity to a high light intensity, the optical unit can vary at once, and when the optical unit varies the light intensity of the light-emitting pattern from a high light intensity to a low light intensity, the optical unit can vary it for a relative long time.

According to the exemplary vehicle headlight system, the exemplary headlight controller can provide a favorable light distribution pattern to safely drive at night while preventing a right and left headlight from emitting a glare type light to oncoming vehicles and vehicles moving forwards in a forward direction of the subject vehicle in accordance with various traffic conditions as described above.

Furthermore, the right and left optical unit 20R and 20L can be used as the right and left headlight having a high reliability for the headlight controller, and can be easy to reduce a size of the headlight with a simple structure. Thus, the disclosed subject matter can provide vehicle headlight systems using the headlight controller and the optical units, which can provide a favorable light distribution pattern that can be easy to drive at night for not only the subject vehicle but also vehicles traveling near the subject vehicle by utilizing the characteristics of the headlight controller and the optical unit, and which can expand possibilities for design so as to be able to harmonize with various vehicular designs.

Various modifications of the above disclosed embodiments can be made without departing from the spirit and scope of the presently disclosed subject matter. For example, cases where the right and left optical unit 20R and 20L is used as the right and left headlight. However, the right and left optical unit 20R and 20L is not limited to this structure and can be integrally incorporated into a high beam and a low beam. In addition, cases where each of the right and left light-emitting device 22 R and 22L includes a plurality of LEDs arranged in matrix array shape having two rows and five columns, is described as a matter of convenience. However, the plurality of LEDs is not limited to this location and can be arranged in matrix array shape having various rows and columns, and also can be arranged in a staggered array shape, etc.

While there has been described what are at present considered to be exemplary embodiments of the invention, it will be understood that various modifications may be made thereto, and it is intended that the appended claims cover such modifications as fall within the true spirit and scope of the invention. All conventional art references described above are herein incorporated in their entirety by reference.

What is claimed is:

1. A headlight controller including an adaptive driving system (ADB) for controlling right and left headlights each having an optical axis be capable of projecting a plurality of light-emitting patterns in a plurality of light-emitting areas, wherein the plurality of light-emitting patterns align in a horizontal direction of a road, each of the light-emitting patterns is independently drown, each of the adjacent light-emitting patterns overlaps with respect to each other without a space between the adjacent light-emitting patterns, and each of edge portions of the plurality of light-emitting areas is a respective one of non-overlapping regions of the adjacent light-emitting patterns and each of middle portions of the plurality of light-emitting areas is a respective one of overlapping regions of the adjacent light-emitting patterns, comprising:
 a camera having an optical axis (CA) being located adjacent a subject vehicle, which incorporates the right and left headlight into a right and left front of the subject vehicle, configured to photograph at least one vehicle located in a forward direction of the subject vehicle, and the camera being configured to output the at least one vehicle photographed by the camera as image data;
 a vehicle detector configured to detect the at least one vehicle in accordance with the image data output from the camera, configured to generate locating data of the at least one vehicle with respect to the optical axis of the camera, and being configured to output the locating data vehicle as vehicle data;
 a light-emitting area controller configured to detect whether the at least one vehicle exists or not in the travelling direction of the subject vehicle in accordance with the vehicle data output from the vehicle detector, configured to determine light pattern data including a light-emitting area and a non-light-emitting area when the vehicle exists, and configured to output said light pattern data as light-emitting area data;
 a light distribution controller configured to receive the light-emitting area data output from the light-emitting area controller, and configured to output a light-emitting control signal to the right and left headlight of the object vehicle in accordance with the light-emitting area data output from the light-emitting area controller; and wherein at least one light-emitting area where the at least one vehicle is located in the plurality of light-emitting areas is darker than another light-emitting area where the at least one vehicle is not located in the plurality of light-emitting areas.

2. The headlight controller including the ADB according to claim 1, wherein each of relative light intensities of the plurality of light-emitting patterns is substantially the same when the vehicle detector does not detect the at least one vehicle in accordance with the image data output from the camera.

3. The headlight controller including the ADB according to claim 2, wherein each area of the adjacent light-emitting patterns overlapped with respect to each other is substantially the same.

4. The headlight controller including the ADB according to claim 2, wherein the camera is a color camera, which photographs color image data.

5. The headlight controller including the ADB according to claim 2, wherein the optical axis of the camera is located in a substantially parallel direction with each optical axis of the right and left headlight.

6. The headlight controller including the ADB according to claim 1, wherein each area of the adjacent light-emitting patterns overlapped with respect to each other is substantially the same.

7. The headlight controller including the ADB and AFS according to claim 1, wherein the camera is a color camera, which photographs color image data.

8. The headlight controller including the ADB according to claim 1, wherein the optical axis of the camera is located in a substantially parallel direction with each optical axis of the right and left headlight.

9. A vehicle headlight system using the headlight controller including the ADB according to claim 1, further comprising:
 a right and left optical unit replaced with the right and left headlight, each of the right and left optical unit including a plurality of light-emitting diodes (LEDs) having a light-emitting surface as a light-emitting device to project the plurality of light-emitting patterns, and an LED drive circuit independently driving each of the plurality of LEDs.

10. The vehicle headlight system using the headlight controller including the ADB according to claim 9, further comprising:
 a projector lens having a projector optical axis located in front of the plurality of LEDs, and the projector optical axis of the projector lens intersecting the light-emitting surface of the LEDs.

* * * * *